March 25, 1930.   J. T. CLARK   1,751,682
CULTIVATOR ATTACHMENT
Filed June 8, 1927   3 Sheets-Sheet 1

John T. Clark,
INVENTOR.

Witnesses
C. E. Churchman Jr.
Wm. R. Smith

BY Richard B. Owen
ATTORNEYS.

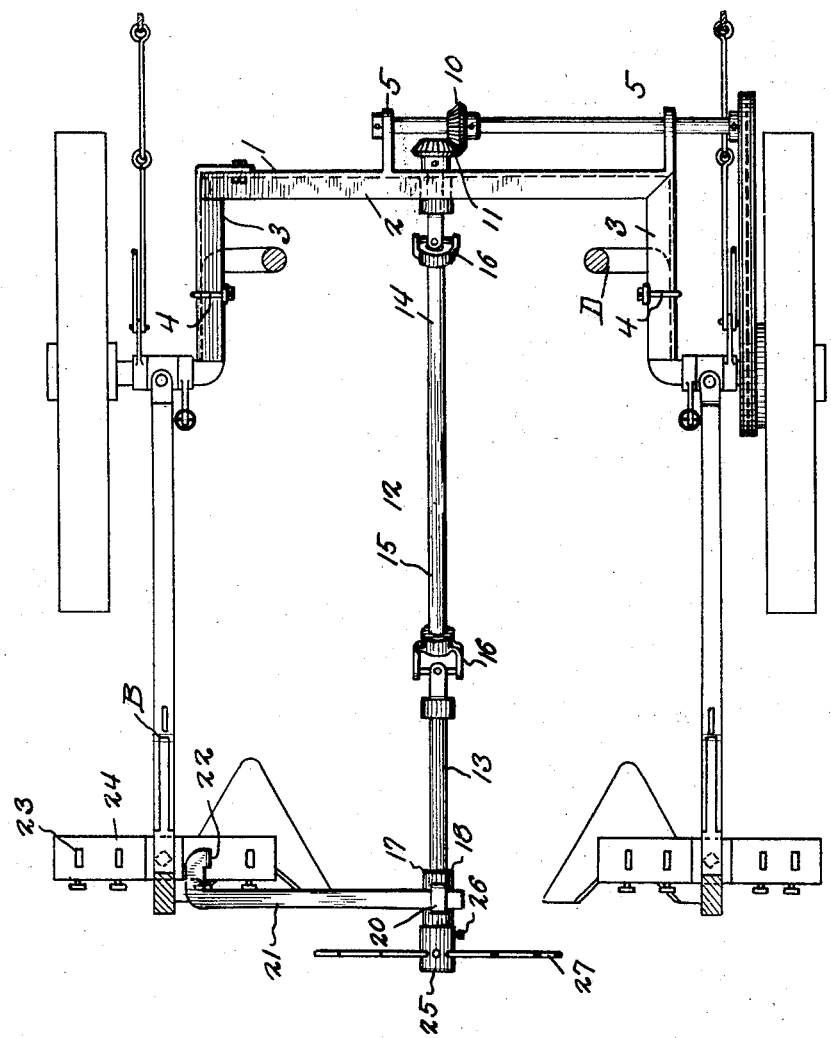

March 25, 1930.  J. T. CLARK  1,751,682
CULTIVATOR ATTACHMENT
Filed June 8, 1927  3 Sheets-Sheet 3
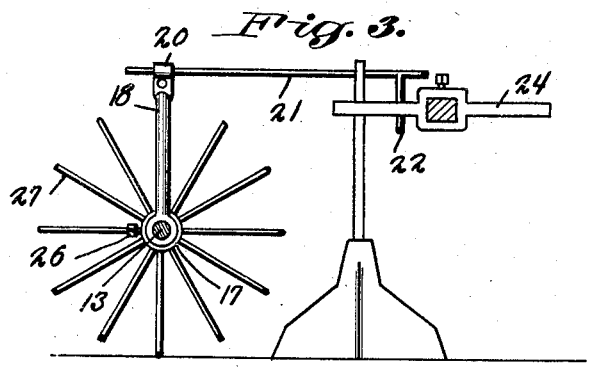
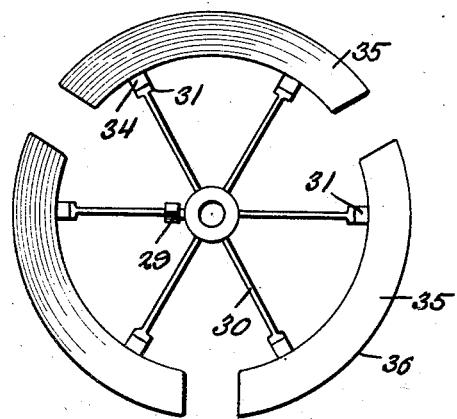
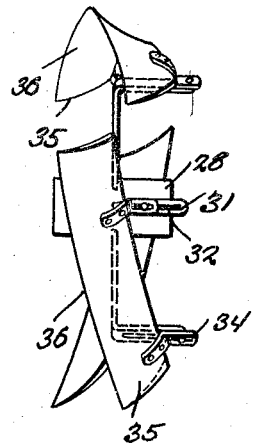
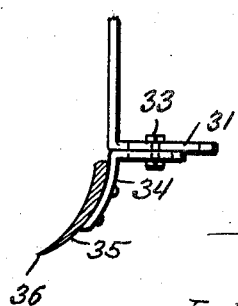
John T. Clark
INVENTOR.
BY *Richard B. Oliver*
ATTORNEYS.
Witnesses
C. E. Churchman
Wm. R. Smith Patented Mar. 25, 1930

1,751,682

UNITED STATES PATENT OFFICE

JOHN T. CLARK, OF LAKE CITY, ARKANSAS

CULTIVATOR ATTACHMENT

Application filed June 8, 1927. Serial No. 197,461.

This invention relates to an attachment for cultivators, and has for its primary object the construction of an attachment by means of which a drill formed by the coaction of a pair of spaced plows may be cultivated by an agitating action transversely of the drill.

An object of the invention is the construction of an attachment that will cultivate the soil by a transverse motion relative to the direction of travel of the cultivator and which is designed to also remove vegetation from the soil at spaced intervals.

Another object of the invention is the construction of an attachment of a complete assembled construction that may be very readily attached to or detached from the frame of the cultivator.

A feature of the invention is the novel construction of the cultivating device and manner of mounting the same so that proper engagement may be had with the earth without in any way interfering with the proper driving of the device by the wheel structure of the cultivator.

Besides the above, my invention is distinguished in the novel construction of a cultivator device suspended from the frame by an adjustable support so that the cultivating device may be properly centered or adjusted and providing a drive shaft of a universal type so as to accommodate adjustments of the cultivating device.

With these and other objects in veiw, my invention will be better understood from a dscription of the same when taken in connection with the accompanying drawings, wherein:—

Figure 2 is a top plan view with a portion of the cultivator cut away;

Figure 3 is a longitudinal sectional view;

Figure 4 is a side elevation of another type of cultivating device;

Figure 5 is a side elevation thereof;

Figure 6 is a cross sectional view of one of the blades.

Figure 1:
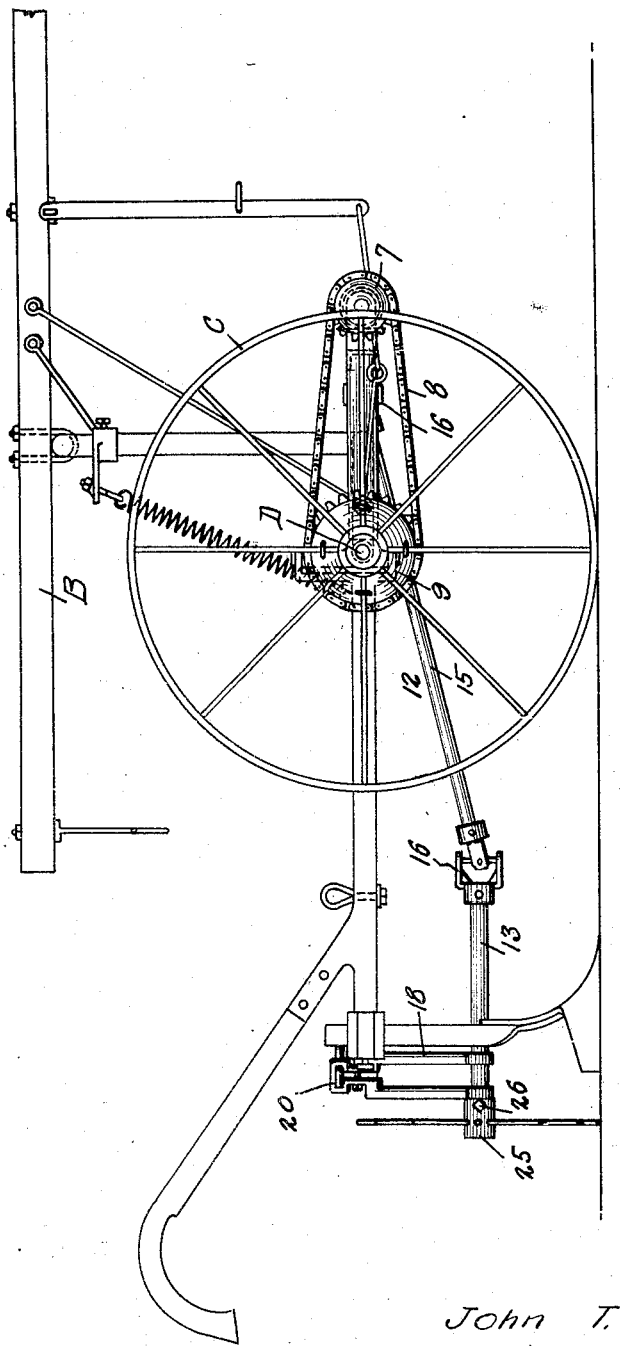
Figure 1 is a side elevation of my attachment shown applied to a cultivator.

Referring to the drawings illustrating one of the many constructions of my invention, the letter B designates the cultivator in its entirety including the wheel structure C and axle D. My improved attachment comprises a bracket 1, shown in this particular instance as of U-shaped formation to provide the yoke 2 and limbs 3 that engage and embrace portions of the axle D and are clamped thereto by the U-bolts 4. Thus my attachment can be effectively secured to a cultivator structure without in any way changing the construction thereof.

The bracket 1 is provided with bearings 5 in which is journaled the drive shaft 6 carrying a driven sprocket 7 connected by the chain 8 to the drive sprocket 9 mounted on the axle D. This drive shaft 6 is provided with a beveled gear 10 meshing with a beveled gear 11 on the sectional drive shaft 12. This sectional drive shaft consists of the end sections 13 and 14 and a universal section 15 connected to the end sections by the universal joints 16. The end section 13 is rotatably mounted in the bearings 17 formed at the lower end of a U-shaped hanger 18, the yoke 19 of which being swingingly mounted in the bearing 20 formed on the end of a horizontally disposed supporting arm 21. This supporting arm 21 is further provided with an extension 22 adjustably associated with a plurality of slots 23 arranged in the cross head 24 of the cultivator.

Various forms of cultivating devices may be connected to the drive shaft, but I have designed two novel types of devices of a construction to more effectively cultivate the earth and remove vegetation at spaced intervals. One of the devices, as shown in Figures 1, 2 and 3, consists of a hub 25 removably mounted on the protruding end of the shaft section 13 by means of a set screw 26. This hub has radially extending therefrom cultivating elements, illustrated as rods 27 which may be of any suitable design or number to bring about the best possible effective action between the rods and the earth to be cultivated.

As far as I have proceeded, it will be appreciated that in the travel of the cultivator, the cultivating device will be rotated to cultivate the drill formed between the companion plow blades of the cultivator in a manner to assure proper cultivation thereof. As the cultivating device is suspended by the hanger 18, it will be appreciated that the same may properly adjust itself in a vertical direction and may be adjusted horizontally by the adjustment of the supporting arm 21. The construction of the drive shaft to enable the same to be flexible allows the cultivating device to be properly adjusted and function in the proper position, although driven directly from the wheel structure of the cultivator.

At times it is advisable to substitute a chopper device for the cultivating device heretofore described, and to accomplish this desired result I provide the type of device illustrated in Figures 4, 5 and 6 which is shown as designed to chop cotton at spaced intervals but may be so designed as to be capable of a cultivating action as well as a chopping action. This chopper, as illustrated, consists of a hub 28 which is also capable of being removably mounted on the end section 13 by the set screws 29. This hub is also provided with radially extending rods 30, which in this particular case terminate in slotted heads 31, the slots 32 of which receive for adjustments the bolts 33 carried by the lugs 34 formed on the blade 35.

By referring to Figures 4 and 5, it will be noted that each blade is curved longitudinally and transversely so that the cutting edges 36 are arranged in off-set relation so as to facilitate the chopping operation. A particular feature of this construction just described is the particular formation of the blade and mode of connection to the rod so as to be adjustable in a radial direction, and as the adjustment is individual to each blade the blades may be individually adjusted relative to each other.

It is, of course, to be understood that the design of the various parts entering into the combination may be changed in various manners to adapt the attachment to various types of cultivators and to adapt the attachment for various uses and, in fact, various types of drive mechanism may be used with my special design of cultivating device and various types of cultivating devices may be used with my novel construction of drive mechanism and, therefore, I do not desire to be limited in any manner except as set forth in the appended claim.

I claim:—

The combination with a cultivator including a wheeled frame and cultivator plows secured to the frame on each side of the longitudinal center thereof, of an attachment therefor including a supplemental frame, means securing the supplemental frame to the cultivator frame, a centrally disposed bearing carried by the supplemental frame and arranged at the longitudinal center of the cultivator frame, spaced bearings carried by the supplemental frame arranged transversely of the cultivator frame, a drive shaft arranged in said pair of bearings, means for operating the drive shaft from the cultivator, an operating shaft mounted in the central bearing, means operatively connecting the shafts together, the operating shaft having incorporated in the length thereof universal joints, a pulling wheel secured to the rear end of the operating shaft, supporting heads arranged above the cultivator plows having transversely extending slots therein, a U-shaped supporting arm rockably mounted upon the operating shaft and normally extending above the same, and a control lever pivotally mounted on the upper end of said U-shaped arm having a depending finger for engaging in a selected slot of either one of said heads.

In testimony whereof I affix my signature.

JOHN T. CLARK.